June 18, 1968  J. A. WEISBECKER  3,388,483
COMPUTER-TYPE GAME AND TEACHING AID
Filed July 21, 1966  2 Sheets-Sheet 1
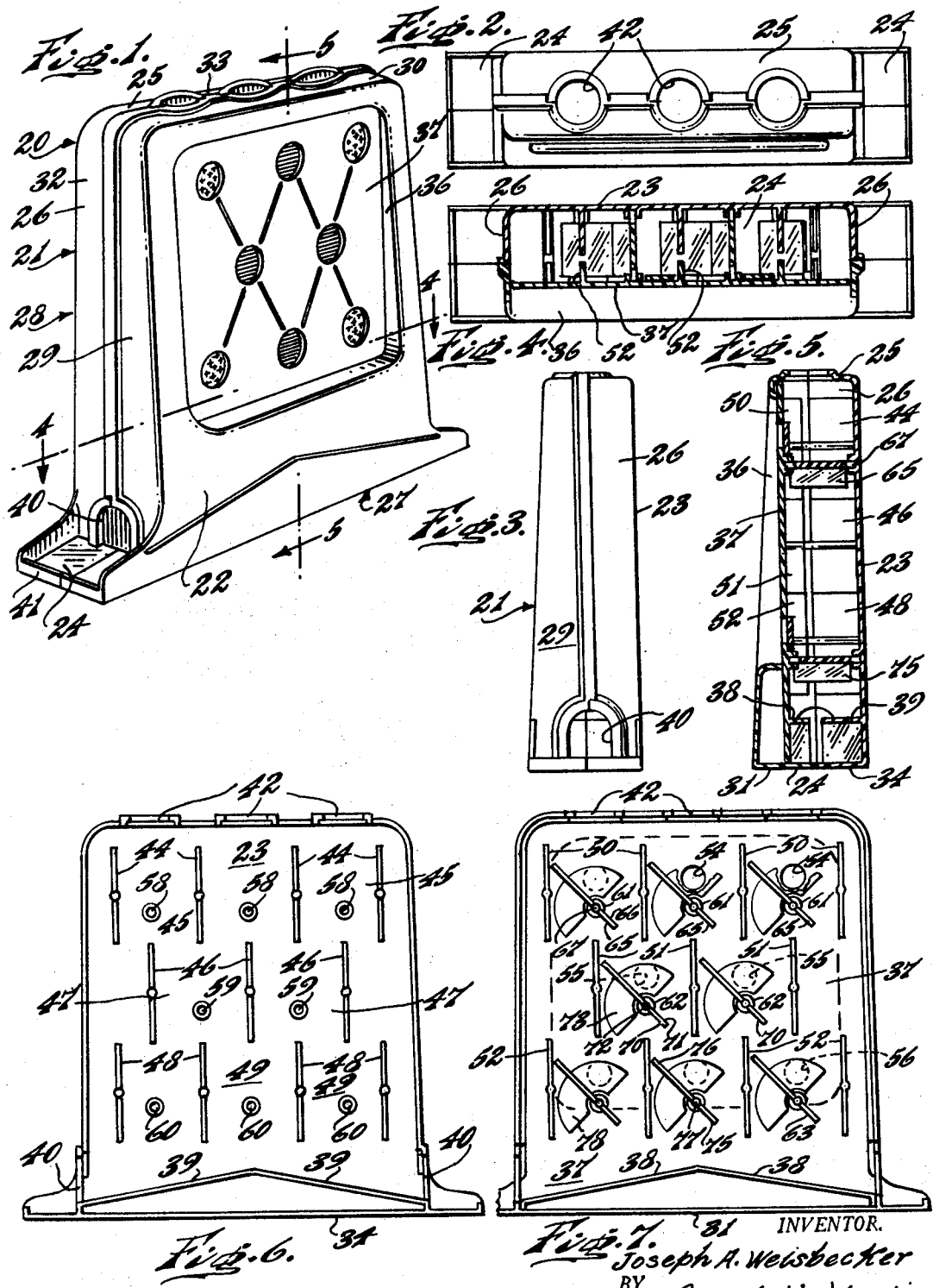
INVENTOR.
Joseph A. Weisbecker
BY Robert K. Youtie
ATTORNEY June 18, 1968   J. A. WEISBECKER   3,388,483
COMPUTER-TYPE GAME AND TEACHING AID
Filed July 21, 1966   2 Sheets-Sheet 2
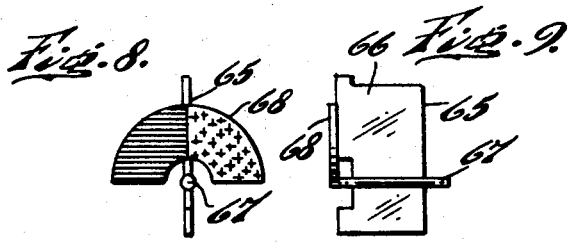
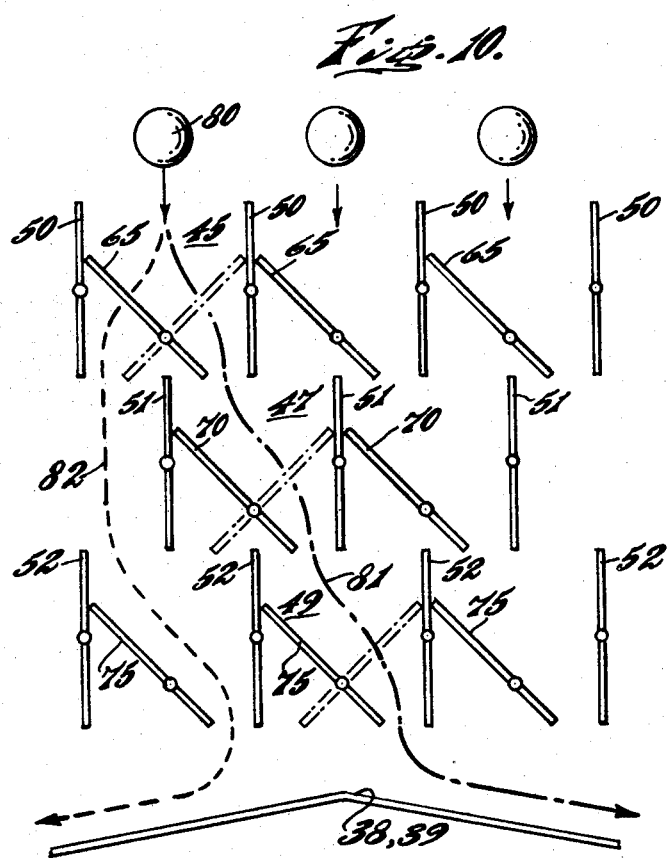
INVENTOR.
Joseph A. Weisbecker
BY Robert K. Youtie
ATTORNEY United States Patent Office 3,388,483
Patented June 18, 1968

3,388,483
COMPUTER-TYPE GAME AND TEACHING AID
Joseph A. Weisbecker, 1220 Wayne Ave.,
Cherry Hill, N.J. 08034
Continuation-in-part of application Ser. No. 462,349,
June 8, 1965. This application July 21, 1966, Ser.
No. 566,881
3 Claims. (Cl. 35—30)

ABSTRACT OF THE DISCLOSURE

This invention relates essentially to an instruction and play device of the computer type wherein an enclosure is provided to receive checks, which serve to produce computer effects upon gravitational movement through the enclosure.

---

This invention relates generally to games and teaching aids, and is especially concerned with such devices as are of the computer type. This application is a continuation-in-part of my copending patent application Ser. No. 462,349, filed June 8, 1965, now Patent No. 3,331,143 issued July 18, 1967.

It is an important object of the present invention to provide a game and teaching aid of the type described having a specific structure, including combination and arrangement of bistable cells which afford a substantial degree of computer action, illustrating memory and response, so as to attract persons of higher intellectual level, while maintaining relative simplicity for attention-arresting use as a toy by relatively young children.

It is a further object of the present invention to provide a game and teaching aid having the advantageous characteristics mentioned in the preceding paragraph which is structurally quite simple for durability and reliability in use, as well as economy in manufacture, and which is neat and attractive in appearance while affording a psychologically attractive degree of mystery simultaneously with the inherent predictability of a computer.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

In the drawings:

FIGURE 1 is a front perspective view showing a game and teaching aid constructed in accordance with the teachings of the present invention;

FIGURE 2 is a top view of the device of FIGURE 1;

FIGURE 3 is a side elevational view of the device of FIGURE 1;

FIGURE 4 is a horizontal sectional view taken generally along the line 4—4 of FIGURE 1;

FIGURE 5 is a sectional elevational view taken generally along the line 5—5 of FIGURE 1;

FIGURE 6 is an internal front elevational view of the rear section of the instant device;

FIGURE 7 is a rear elevational view showing the interior of the front section of the instant device;

FIGURE 8 is a front elevational view showing a check director of the instant invention;

FIGURE 9 is a side elevational view of the check director of FIGURE 8; and

FIGURE 10 is a diagrammatic representation of the operation of the instant device.

Referring now more particularly to the darwings, and specifically to FIGURES 1–7 thereof, a game and teaching aid of the present invention is there generally designated 20, and includes a generally boxlike enclosure 21 having a front wall 22, back wall 23, bottom wall 24, top wall 25, and a pair of opposite side walls 26.

More particularly, the enclosure 21 includes complementary front and rear sections 27 and 28 respectively defining the front and rear walls 22 and 23, and having generally peripheral flanges or circumferential walls combining to define the top, bottom and side walls of the enclosure 21. That is, the front wall 22 incudes side flanges or wall portions 29, a top flange or wall portion 30, and a bottom flange or wall portion 31, while the back wall 23 is provided with side flanges or wall portions 32, a top flange or wall portion 33, and a bottom flange or wall portion 34. With the front wall 22 and back wall 23 in facing spaced relation, the adjacent top flanges 30 and 33 combine to define the top wall 25, while the bottom flanges 31 and 34 combine to define the bottom wall 24, and adjacent pairs of side flanges 29 and 32 combine to define the side walls 26.

In addition, the front wall 22 is formed with a relatively large, generally central opening 36, which may be of generally rectangular-outline configuration, and is closed by a plate 37 extending across the opening 36 and substantially completely occupying the space between the top flange 30, bottom flange 31, and side flanges 29. Provided on a lower rear region of the front wall plate 37 are a pair of inclines or ramps 38 declining from a juncture laterally medially of the enclosure 21 away from each other to respective side walls 26. The back wall 23 is similarly provided on the front or inner side thereof, in a lower region with a pair of ramps 39 declining from a juncture laterally medially of the back wall, away from each other toward opposite side walls 26. The ramps 39 are substantially coplanar with the ramps 38, combining to define a pair of oppositely laterally outwardly declining ramps.

The side walls 26 are each formed in a lower region thereof with a thru opening 40, at the lower ends of respective ramps 38, 39, the openings providing discharge means for checks rolling down the ramps, as will appear presently. The bottom wall 24 extends laterally outward beyond the side walls 26, and is there provided with a retaining wall 41 for retaining a check passed outward through the adjacent side-wall opening 40.

The top wall 25 is formed with a plurality of thru openings or holes 42 arranged in a laterally extending row between the side walls 26. The number of spaced thru openings 42 in the top wall 25 is advantageously an odd number, and preferably three, as in the illustrated embodiment. In practice, the top-wall openings 42, as well as the side-wall openings 40 may be defined by notches or cutouts configured in the mating top-wall portions or flanges 30 and 33, and side-wall portions or flanges 29 and 32.

Interiorly of the enclosure 21, adjacent to and below the top wall 25 are a group of laterally spaced internal walls 44. The several internal walls 44 extend forwardly and rearwardly, advantageously being formed integrally with the rear wall 23 and extending forwardly therefrom, being of generally vertical disposition, and combining to define therebetween a plurality of generally vertical passageways 45, each beneath and communicating upwardly with a respective thru opening 42.

Below the group of laterally spaced internal walls 44 is a second group of laterally spaced internal walls 46, of generally vertical disposition and extending forwardly from the rear wall 23. The internal walls 46 are located in laterally alternate relation with respect to the internal walls 44, so that the walls 46 combine to define therebetween generally vertical check passageways 47 each communicating with the adjacent upper pair of passageways 45. That is, the passageways 47 are offset laterally with respect to the passageways 45, so that the lower passageways each communicate upwardly with an adjacent pair of the passageways 45.

An additional group of laterally spaced internal walls 48 is located below the internal walls 46, the walls 48 being disposed generally vertically and extending forwardly from the rear wall 23 in laterally offset or alternate relation with respect to the walls 46. Thus, the internal walls 48 combine to define generally vertical passageways 49, each communicating upwardly with the adjacent upper pair of passageways 47. The passageways 49 communicate downwardly with the oblique tracks or ramps 38, 39.

Provided on the inner or rear surface of front-wall plate 37 may be an upper group of generally vertically disposed laterally spaced wall portions 50, each in alignment with a respective internal wall 44. Similarly, a group of laterally spaced internal wall portions 51, each extend generally vertically and project rearwardly from front-wall plate 37 in substantial alignment with respective internal walls 46; and, an additional group of laterally spaced, vertically disposed wall portions 52 project rearwardly from wall plate 37 in respective alignment with internal walls 48.

The front-wall plate 37 is further formed with a plurality of laterally spaced thru openings or windows 54 each visually communicating with the interior of a respective passageway 45. Beneath the windows 54 is a second group of visual-access openings or windows 55 formed in the front-wall plate 37, in laterally spaced relationship and opening into respective passageways 47. An additional group of laterally spaced visual-access openings or windows 56 is formed in the front-wall plate 37 for access to respective passageways 49.

In the preferred embodiment, as illustrated, there are three upper passageways 45, two next lower passageways 47, and three additional lower passageways 49. It is preferred that the upper group of passageways 45 be of an odd number, and that the number of vertically superposed groups of passageways 45, 47 and 49 be at least equal to the odd number of upper passageways.

Provided on the inner or front side of rear wall 23, in each of the passageways 45, generally centrally thereof, is a journal bearing or socket 58. Similarly, a journal bearing or socket 59 is formed on the front side of rear wall 23 projecting medially into each passageway 47, and additional sockets 60 project from the inner side of rear wall 23 laterally medially into each lower passageway 49. The inner or rear side of front-wall plate 37 is formed with a laterally spaced group of journal bearings or sockets 61 in respective alignment with the sockets 58, an additional laterally spaced group of journal bearings or sockets 62 in respective alignment with the sockets 59, and still another group of laterally spaced journal bearings or sockets 63 in respective alignment with the sockets 60.

Arranged in each of the upper group of passageways 45 is a check director 65. The check directors each includes an elongate member or plate 66 having a pintle or pin 67 extending forwardly and rearwardly therethrough for rotative engagement in aligned bearing supports 58 and 61. The pintle 67 of each director plate 66 is at a location below the center of gravity of the respective director plate, so that the latter swings gravitationally downward against one or the other of internal walls 44 and wall portions 50, into alternate gravitationally stable positions. Carried by the elongate director member 66 is a generally semicircular display member or plate 68 located in facing relation with respect to the adjacent window 54 and movable therealong. Each display member 68 may have segments of its front surface provided with suitable characterizing indicia, say different colors as shown in FIGURE 8.

Located in each of the passageways 47 is a director 70, which may be substantially identical to each of the directors 65, including an elongate member or plate 71 provided at a point below its center of gravity with a pintle 72 journaled in aligned bearings 59 and 62 for swinging movement between a pair of alternate gravitationally stable positons. Also carried by each director member 71 may be a generally semicircular display plate 73 having segments of characterizing indicia for alternate visual presentation through respective windows 55.

An additional group of check directors 75 may be located in the passageways 49, respectively, each including an elongate director member or plate 76 having a pintle 77 located at a point below the center of gravity of the respective director member and journaled in an aligned pair of bearings 60 and 63. Each director member 76 may carry a generally semicircular display member or plate 78 having segments of characterizing indicia on the forward surface thereof for alternate presentation through respective windows 56.

In operation, the enclosure 21 may be tilted toward one side 26 to swing all of the directors 65, 70 and 75 to one side, as shown in FIGURE 7, whereupon the display members 68, 73 and 78 will present a design such as illustrated in FIGURE 1. A ball or other check may be dropped through a selected one of the openings 42 for gravitational passage downward through the adjacent passageway 45. The check is directed to one side of the receiving passageway 45, the rightward side as seen in FIGURE 7, and gravitational downward movement of the check engages the lower end of the director member 66 to swing the latter to its opposite stable position. The same procedure occurs as the check passes downward through each successive passageway 47 and 49. From the lower passageway 49 the check falls to bottom-wall ramp 38, 39, and depending upon the lateral position of engagement with the ramp, the check rolls downward and outward through a particular one of the side-wall openings 40.

A sequence of operation is illustrated in FIGURE 10, a ball 80 being dropped downwardly through passageway 45, being directed rightward therein by director 65 in its solid-line position, for movement into the adjacent lower rightward passageway 47 and rightward direction therein by the associated director 70 in its solid-line position. The check then proceeds along the direction of dot-and-dash line 81 to the next lower rightward passageway 49, and is directed rightwardly and downwardly therefrom by the director 75 in its solid-line position, to drop on the ramp 38, 39 on the rightward side of the ramp juncture for movement therealong outward through the rightward side-wall opening 40. Repeated passage of the ball 80 downward through passageway 45 will effect ball movement along the dashed line 82 as effected by the phantom position of director 65, for eventual dropping on the leftward side of ramp 38, 39 and discharge through the leftward side-wall opening. Thus, the same procedure repeated by a user of the device results in discharge of the check from opposite sides of the enclosure.

Obviously, many different games may be played, such as guessing the discharge side of a check, attempting to change all the display-member indicia to the same, or a particular pattern, and many others. Also, the fundamentals of computer logic may be learned and appreciated, as the display-member indicia indicate a condition of each passageway or cell, in the manner of a binary computer, the cells or passageways having memory or being programmed, as by tilting of the enclosure or other operation of the directors to assume a desired state.

From the foregoing, it is seen that the present invention provides a game and teaching aid which fully accomplishes its intended objects and is well adapted to meet practical conditions of manufacture and use.

Although the present invention has been described in some detail by way of illustration and example for purposes of clarity of understanding, it is understood that certain changes and modifications may be made within the spirit of the invention and scope of the appended claims.

What is claimed is:

1. A game and teaching aid comprising a boxlike enclosure having front, back, top, bottom and side walls; said top wall having a plurality of check-receiving thru openings arranged in a laterally extending row; a first group of laterally spaced internal walls extending forwardly and rearwardly in said enclosure and defining therein a plurality of first downward check passageways beneath and communicating with respective thru openings; a second group of laterally spaced internal walls extending forwardly and rearwardly in said enclosure beneath and in alternate relation with said first group of internal walls and defining a plurality of second downward check passageways each communicating with the adjacent upper pair of passageways; and a plurality of check directors each located in a respective one of said first and second passageways, said directors being gravitationally stable in a pair of alternate positions respectively directing a gravitationally passing check into opposite adjacent lower passageways and being shifted between alternate positions by passage of a check, said enclosure comprising a pair of front and back complementary sections; said front section including said front wall and circumferentially extending rearwardly projecting top, bottom and side wall portions; and said back section including said back wall and circumferentially extending forwardly projecting top, bottom and side wall portions; said rearwardly projecting top, bottom and side wall portions being in generally coplanar edge-to-edge relation with said forwardly projecting top, bottom and side wall portions, respectively, to define said top, bottom and side walls.

2. A game and teaching aid according to claim 1, said top wall portions having their adjacent edges cut away in alignment with each other to define said check-receiving openings.

3. A game and teaching aid according to claim 1, said side wall portions having their adjacent edges cut away in alignment with each other adjacent to said bottom wall to define check-discharge openings in said side walls.

References Cited

UNITED STATES PATENTS 3,331,143  7/1967  Weisbecker _____ 35—30

EUGENE R. CAPOZIO, *Primary Examiner.*

W. H. GRIEB, *Examiner.*